310-12 SR
FIP8502 XR 3,643,242

United States Patent [15] 3,643,242
Bryer [45] Feb. 15, 1972

[54] TRANSDUCER DISPLACEMENT CONTROL IN MOVABLE HEAD-TYPE STORAGE DISK SYSTEMS

[72] Inventor: Philip Stuart Bryer, Woodland Hills, Calif.
[73] Assignee: Xerox Corporation, Stamford, Conn.

[22] Filed: July 9, 1970
[21] Appl. No.: 53,500

[52] U.S. Cl. ....................340/174.1 C, 310/12
[51] Int. Cl. ....................G11b 21/08, H02k 41/02
[58] Field of Search ....................340/174.1 C; 179/100.2 CA; 310/12

[56] References Cited

UNITED STATES PATENTS

| | | | |
|---|---|---|---|
| 3,484,760 | 12/1969 | Perkins et al. | 340/174.1 C |
| 3,544,980 | 12/1970 | Applequist et al. | 340/174.1 C |
| 3,576,454 | 4/1971 | Beach, Jr. | 340/174.1 C |

*Primary Examiner*—Bernard Konick
*Assistant Examiner*—Vincent P. Canney
*Attorney*—Smyth, Roston & Pavitt

[57] ABSTRACT

A plurality of transducers are positioned radially relative to a stack of disks, by means of a linear motor whose stator and voice coil are mounted on separate, movable carriages for relative, colinear displacement along low-friction paths, to inhibit transfer of momentum to stationary structure.

4 Claims, 3 Drawing Figures

Fig. 1

INVENTOR.
Philip S. Bryer

By Smyth, Roston & Pavitt
ATTORNEYS

TRANSDUCER DISPLACEMENT CONTROL IN MOVABLE HEAD-TYPE STORAGE DISK SYSTEMS

The present invention relates to improvements for rapid action displacement control such as, for example, between a transducer and a rotating storage disk, for changing tracks.

So-called movable head disk files are used in computers as a medium access speed, memory extension. Access to particular information on a disk of such a disk file is slower than access to information on a disk file having one transducer pair per track, because in the movable head type disk memory the head must change tracks. Particularly in the movable head type disk memory, a transducer head is to be positioned selectively adjacent one of a plurality of concentrical tracks on a rotating disk, and a section of that track is accessed subsequently. Therefore, the transducer must change position, upon demand, in radial direction and very rapidly to minimize access time. For this, a rather powerful linear motor is used to displace and to position the transducer. The controlled displacement must not only be fast but also be very accurate.

It was found that the linear motor imparts severe shocks upon its support which, in turn, is detrimental to the accuracy of operation. The shocks result essentially from the very steep onset of a high acceleration followed by a steep drop in acceleration which in turn is followed by severe braking of the movable part of the linear motor, all of which reflects upon the stator of the motor and its anchoring. The present invention overcomes the problem posed by the production of shocks in known equipment.

In accordance with the preferred embodiment of the invention, it is suggested to provide two runways or displacement paths, one for the so-called voice coil of the linear motor to which is mechanically connected the transducer support structure; the other runway is provided for the stator of the linear motor. Conveniently, one can consider two carriage assemblies, one constituted by the voice coil with transducer and support structure to be moved in relation to the rotating disk. The other carriage is constituted by the stator. Each carriage assembly moves on its respective runway and displacement path at lowest possible friction, so as to minimize interaction with runway and support structure generally. Neither carriage assembly is subjected to any significant braking through interaction with stationary mounting structure except that escapement from predetermined ranges of displacement is inhibited.

The two carriage assemblies are to have a mass differential, there is preferably a significant difference between the masses involved in that the stator carrier is the heavier one. Any energization of the voice coil results in a mutual displacement between the coil and the stator, and due to the mass differential there is also significant displacement of the coil with transducer carriage relative to the disk whose axis is stationary. In order to obtain definite relative displacement positions, current flow in the voice coil is controlled that acceleration and deceleration phases are equal so that the resulting forces are oppositely equal. Moreover the forces act always in opposite directions upon the two carriages. Thus, they both start, move and stop immediately without braking, particularly if friction is insignificantly low. Any residual force imbalance can be taken care of by impeding residual creeping motion of either carriage.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 1, 2, 3:
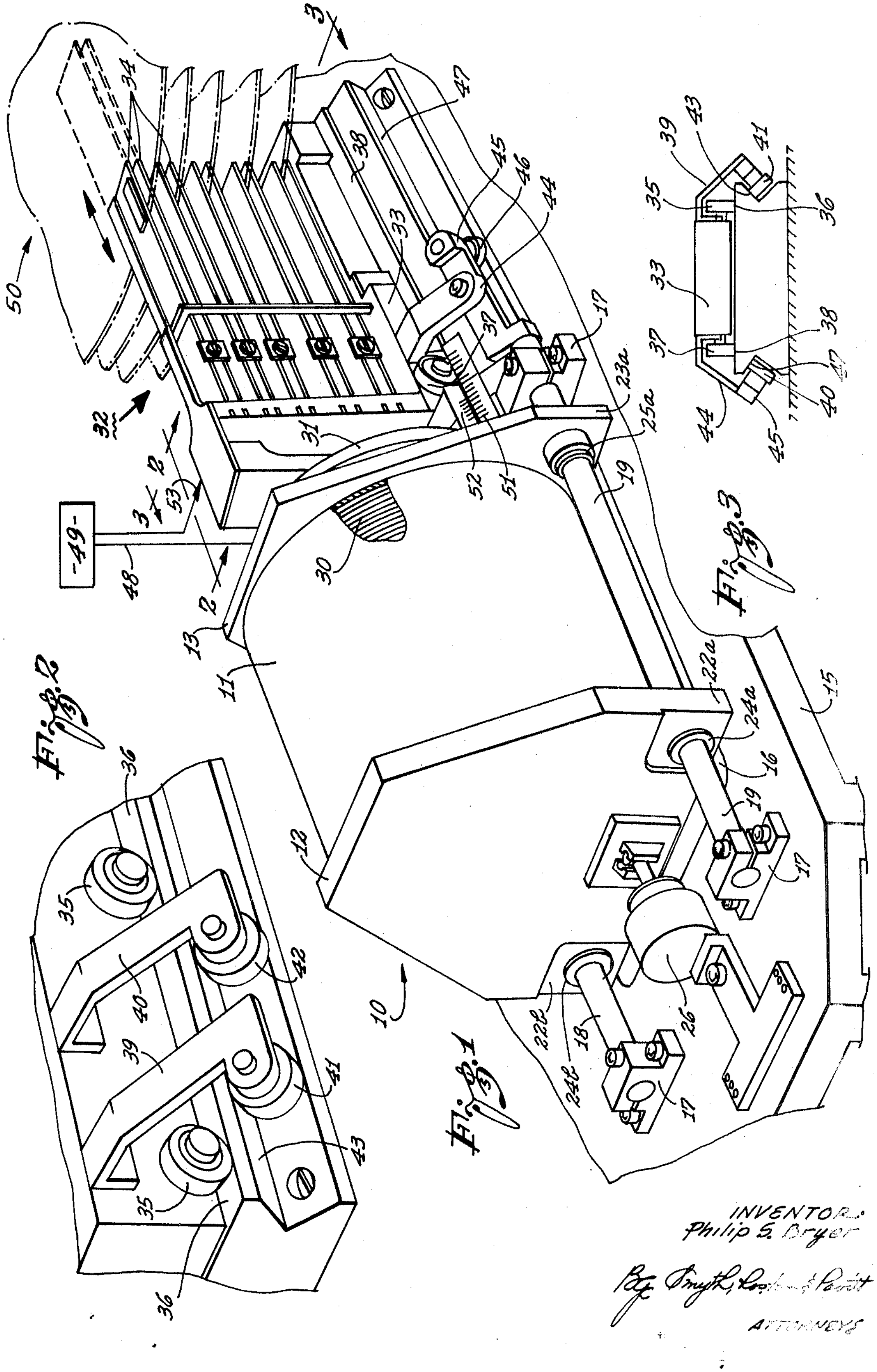
FIG. 1 is a perspective view of a linear motor for positioning plural transducers relative to a stack of recording disks.
FIG. 2 is a detail of the structure of FIG. 1 as seen from the opposite side.
FIG. 3 is a partial front view of the transducer carriage shown in FIGS. 1 and 2.

Proceeding to the detailed description of the drawings, there is illustrated a linear motor 10 having as its principal function the control of positioning a plurality of transducers relative to a stack of disks 50. The motor controls the position of the transducers for particular selection of a track on one of the disks; one of the transducers is then to interact with the selected track. The disks are mounted for rotation about a vertically oriented axis and the linear motor displaces and positions the transducers in horizontal direction and radially to that axis.

Linear motor 10 has a tubular, horizontally oriented stator housing 11 with end plates 12 and 13. The housing 11 includes the stator magnet or magnets, which may be electromagnets or permanent magnets. In either case, housing 11 includes relatively a large quantity of magnetic material to provide the stator field, and that material constitutes a rather heavy mass.

The entire arrangement is disposed on a table 15 or the like having a cutout portion 16 to obtain rather low positioning of the center of gravity of the stator. Adjacent the corners of the cutout 16 there are support and clamping brackets 17 for mounting guide rails or rods 18 and 19. These rods 18 and 19 are polished, and they are positioned very accurately parallel to each other, each of them extending precisely in the horizontal so that together they provide a horizontal guide way of great precision. These rods 18 and 19 define a displacement path and runway for the stator.

The stator housing is constructed as a carriage. In particular, end plates 12 and 13 are provided with laterally extending arms **22*a*, 22*b* and 23*a*, 23*b* (not shown) respectively. These arms support longitudinal ball bearings such as 24*a*, 24*b* and 25*a*, 25*b* (not shown) respectively. The longitudinal ball bearings 24*a* and 25*a* ride on rod 19, the bearings 24*b* and 25*b* ride on rod 18. Hence the stator structure is mounted for longitudinal displacement on the rods 18 and 19, as these rods extend precisely parallel to the axis of the stator when riding on the rods. The construction of this stator carriage has been chosen to ride on the rail rods with minimum friction so that momentum is not transmitted by the carriage stator upon table 15**.

The rear plate 12 is resiliently connected with damper 26 which is mounted on table 15. The damper is provided to merely stop any residual creeping motion of the stator without exerting a braking effect in normal operation to be described. Additionally, damper 26 serves as stopper in case the station overshoots its normal range of displacement. In essence, damper 26 has a resilient diaphragm connected to a rod 27 that is linked to plate 12. In the normal range of stator displacement, resilient interaction between the stator and the diaphragm is negligible.

The linear motor 10 has a movable operating element which includes a voice coil 30 mounted on a carrier 31. The voice coil receives current of controlled magnitude, duration and direction to energize the coil for controlled displacement over particular distances. Coil carrier 31 is connected to a carriage structure 32 serving primarily for supporting the transducers that are to cooperate with the stack of magnetic recording disks 50. These disks are mounted on a shaft which is driven by a suitable motor (not shown).

The carriage structure 32 has a horizontal carriage base 33 on which are mounted a plurality of arms 34 in vertically stacked arrangement. The transducers are mounted to these arms. The carriage base 33 has six wheels which ride on several rails. A first pair of wheels 35 ride on a first track established by a flat rail 36 that is secured to or is part of table 15. A third wheel 37 on base 33 rides on a second track established by a flat rail 38, which extends parallel to rail 36. The three wheels 35 and 37 establish a three-point contact on the support, as established particularly by two horizontal tracks 36, 38.

Arms 39 and 40 extend from one side of base 33 for journaling wheels 41 and 42 to ride on a flat rail 43. The wheels 41 and 42 are coplanar but their plane of rotation has an angle of about 45° to the plane of table 15. Thus, the surface of rail 43 has a similar angle relative to flat rail track 36. An arm 44 extends from the other side of base 33 for establishing a tilted pivot for a spring-biased rocking lever 45. A wheel 46 is journaled to lever 45 and rides on a rail 47. The plane of rotation of wheel 46 is at right angles to that of wheels 41 and 42. Thus, the rail track 47 has a surface that is at a 45° angle to the surface of track 38.

The wheels 41, 42 and 46 ride on the respective rails by engaging them from below. Due to spring bias of arm 44, binding of the wheels is prevented. However, there should be no significant friction and rather slight pressure suffices. The plurality of rails 36, 38, 43 and 47 establish a runway and displacement path for the carriage 32 that is colinear with the displacement path for the stator as established by rods 18 and 19.

It can thus be seen that neither the stator nor the transducer carriage in the voice coil are supported in any other way than through rolling engagement on the several means defining low-friction displacement paths. Moreover, the gripping as provided by the particularly arranged wheels 41, 42 and 46 prevents tilting of carriage 32 around its longitudinal axis, as well as deviation from a straight, radially directed path with reference to the axis of the disk path. Scales 51 and 52 are provided, scale 51 being stationary and scale 52 being mounted to carriage 32 to provide visible indication of the relative position of the transducer carriage.

A flexible connection 48 leads from a control circuit 48 to the voice coil 31 to control amplitude, duration and direction of current flow through the voice coil. As schematically indicated, control circuit 49 has an input 53 that is derived from the position of carriage 32 related to the base structure including table 15, which in the essence is a related position to the axis of the stack of disks 50. That position pick up 53 is conventional, magnetic or optical means are provided. Generally speaking, control 49 controls voice coil displacement from one position to another one through oppositely equal acceleration and deceleration phase, to stop the voice coil carriage dynamically in the new position. A specific example for the control circuit is disclosed in a separate patent application (D–3881).

Suitably placed brakes may be provided to maintain the voice coil 31 in a particular position after having moved. Alternatively, and additionally, the voice coil 31 with transducer carriage may be maintained dynamically in a particular position through feedback and control operation. This aspect is of no immediate significance for the invention.

Generally, the control circuit 49 provides a current at a rather high amplitude, or rising toward a rather high amplitude, to obtain acceleration of the voice coil. Thereafter, the current may drop to a level sufficient to sustain motion of the voice coil with carrier and carriage, overcoming friction which is to be made as low as possible. Subsequently, the current through the voice coil reverses, rises to a suitably high braking level to stop the movable assembly. It may well occur, however, that there is no steady phase but that the control goes directly from acceleration to deceleration. In any event, each near discontinuity in the time derivative of the current through the voice coil is the source for a shock on the carriages.

The time integral of the acceleration and deceleration phases produces the resulting velocity of the voice coil 30 with carrier 31 and carriage 32 attached. In accordance with the mass of that assembly it has a particular momentum in any instant. As stator 10 is constructed as a linearly movable carriage, a momentum of equal magnitude but opposite direction (sign) is imparted upon it. However, the mass of the stator carriage is to be significantly larger than the voice-coil-carrier-carriage assembly so that the resulting velocity of the stator carriage is correspondingly low; the ratio of the two velocities is inversely proportional to the ratio of the two masses, so is the ratio of the displacement paths relative to the table, as either assembly is to move at lowest possible friction. Ratios in the order of 20:1 are envisioned here, but this is not critical per se.

As the interacting forces between stator assembly and voice coil assembly are oppositely equal in an instant and as the resulting motion requires conservation and constance of momentum, and since there is low friction, both, stator assembly and voice coil assembly, will come to a full stop simultaneously if controlled acceleration equals controlled deceleration. As friction cannot be expected to provide retardation to either assembly at precisely the same ratio, small residual motion may be observed on the stator assembly and that motion is stopped by the damper 26.

The position control has to take into consideration that the voice coil assembly is displaced in response to a particular controlled profile of the current through that coil, resulting in a particular distance or displacement relative to the stator. However, the stator moves in the opposite direction but at a considerably lesser amount. The resulting displacement of the transducer carriage relative to the disk assembly is the difference between voice coil and stator displacement. The precise transducer carriage displacement is additionally position controlled relative to the table 15.

It should be mentioned that the carriages and their respective roll paths are constructed so that any displacement is reversible without special measures. That is to say the transducer carriage can be moved between any two positions directly or through intermediate stops and back into the original position without having to take into consideration that the stator moves likewise, as the stator will return likewise to the original position due to practical complete balance of momentum for each displacement.

It is a significant feature that there is no positive braking provided as between either of the movable assembly and the stationary assembly, except for arresting of residual creeping motion. Throughout operation as particularly defined by positive acceleration and deceleration phases, i.e., from start to stop of the stator assembly and of the voice coil assembly, there is as little interaction as possible between the moving parts and the stationary support.

The invention is not limited to the embodiments described above but all changes and modifications thereof not constituting departures from the spirit and scope of the invention are intended to be included.

I claim:

1. In a disk file system having at least one rotating disk and a transducer disposed for radial displacement relative to the axis of the disk to cooperate with different annular tracks on the disk, there being stationary support means, the combination comprising:

first means on the support means defining a linear displacement path;

a stator for a linear motor, constructed as a carriage for movement on the displacement path at minimum friction;

second means on the support means defining a second linear displacement path codirectional to the first displacement path; and an assembly that includes a voice coil for completion of the linear motor and disposed for cooperation with the stator, the assembly further including a transducer carriage connected to the voice coil for movement therewith and disposed for movement on the second displacement path, the stator carriage and the assembly having significant mass differential, so that upon energization of the voice coil for displacement thereof relative to the stator, there is a resultant displacement of the transducer carriage relative to the stationary support means and the disk.

2. In a system as in claim 1, there being resilient damper means interposed between the stator and the stationary support means, providing substantially no interaction for displacement of the stator in a particular range.

3. In a system as in claim 1, the second means defining a pair of flat parallel tracks, the transducer carriage provided with three wheels, two riding on one, the other wheel riding on the other one of the pair of tracks to establish three-point contact.

4. In a system as in claim 1, the first means including a pair of rods, positioned parallel to each other and defining the direction of the linear displacement path, the stator carriage provided with bearing means and substantially freely riding on the rods over a predetermined displacement length.

* * * * *